(12) United States Patent
Jingu

(10) Patent No.: US 11,736,672 B2
(45) Date of Patent: Aug. 22, 2023

(54) IMAGE PROCESSOR AND METHOD FOR VIRTUAL VIEWPOINT SYNTHESIS IN A VEHICLE-BASED CAMERA SYSTEM

(71) Applicant: Faurecia Clarion Electronics Co., Ltd., Saitama (JP)

(72) Inventor: Yasuyuki Jingu, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 161 days.

(21) Appl. No.: 17/416,482

(22) PCT Filed: Mar. 26, 2019

(86) PCT No.: PCT/JP2019/012707
§ 371 (c)(1),
(2) Date: Jun. 19, 2021

(87) PCT Pub. No.: WO2020/136929
PCT Pub. Date: Jul. 2, 2020

(65) Prior Publication Data
US 2022/0078390 A1  Mar. 10, 2022

(30) Foreign Application Priority Data

Dec. 27, 2018 (JP) .................................. 2018-245393

(51) Int. Cl.
*H04N 13/111* (2018.01)
*H04N 13/243* (2018.01)
(Continued)

(52) U.S. Cl.
CPC .............. *H04N 13/111* (2018.05); *B60R 1/00* (2013.01); *H04N 13/243* (2018.05);
(Continued)

(58) Field of Classification Search
CPC .. H04N 13/111; H04N 13/398; H04N 13/243; B60R 1/00; B60R 2300/60; B60R 2300/105; B60R 2300/303
See application file for complete search history.

(56) References Cited

U.S. PATENT DOCUMENTS

2013/0141547 A1   6/2013   Shimizu
2015/0139499 A1   5/2015   Shimizu

FOREIGN PATENT DOCUMENTS

JP         2012-033038 A      2/2012

OTHER PUBLICATIONS

International Search Report from corresponding International Application No. PCT/JP2019/012707, dated Jul. 2, 2019, 2 pages including translation.

*Primary Examiner* — Kyle M Lotfi
(74) *Attorney, Agent, or Firm* — Tucker Ellis LLP

(57) ABSTRACT

An image processor includes a storage portion to store projection plane vertex information in which coordinate information of each vertex of a divided projection plane and identification information given to the divided projection plane are linked and coordinate transformation information of the coordinate information, an information control portion to specify all of the divided projection planes constituting a projection region of a stereoscopic image from a virtual viewpoint, to acquire the identification information of the specified divided projection plane, and to acquire the coordinate information of the vertex based on the acquired identification information, and a display control portion to transform the coordinate information of each vertex of the divided projection plane acquired based on the coordinate transformation information of the storage portion, and to create the stereoscopic image based on the image signal
(Continued)

output from the photographing device and the coordinate information after the coordinate transformation.

11 Claims, 11 Drawing Sheets

(51) Int. Cl.
    *H04N 13/398*     (2018.01)
    *B60R 1/00*     (2022.01)
(52) U.S. Cl.
    CPC ...... *H04N 13/398* (2018.05); *B60R 2300/105* (2013.01); *B60R 2300/303* (2013.01); *B60R 2300/60* (2013.01)

IMAGE PROCESSOR AND METHOD FOR VIRTUAL VIEWPOINT SYNTHESIS IN A VEHICLE-BASED CAMERA SYSTEM

CROSS-REFERENCE TO RELATED APPLICATION

The present application is based on and claims priority to Japanese Patent Application No. 2018-245393, filed on Dec. 27, 2018, the disclosure of which is hereby incorporated by reference in its entirety.

TECHNICAL FIELD

This disclosure relates to an image processor and an image processing method that create a stereoscopic image from a predetermined virtual viewpoint based on an image signal output from a photographing device that captures a road surface around a vehicle.

BACKGROUND ART

It is known a technique that synthesizes images captured by a plurality of cameras mounted on a vehicle to create an overhead image or a stereoscopic image around the vehicle, and displays the image on a monitor. Such a synthesized image is referred to as a "3D view". This 3D view is a technique that three-dimensionally expresses an image of a vehicle and a surrounding thereof by using a 3D coordinate as a projection plane.

As a conventional technique using the 3D view, a simulation image creation device is disclosed (see JP2012-033038A, for example). The simulation image creation device is configured to create a real-time simulation image with which a user can walk through, drive through, or a fly through in real time a virtual world created by computer graphics.

The technique disclosed in JP2012-033038A includes two virtual cameras. One of the two virtual cameras is used for selecting a 3D model and the other of the two virtual cameras is used for displaying. The virtual camera for selecting a 3D model has a visual field range larger than that of the virtual camera for displaying. The technique disclosed in JP2012-033038A firstly draws a visual field including a range which may be displayed in a future (range to be newly displayed) with the visual field range of the virtual camera for selecting. The technique secondly cuts out the display range with the virtual camera for displaying to be displayed on a display.

SUMMARY

However, as the technique disclosed in JP2012-033038A requires the separate virtual camera for selecting and also a large drawing range, 3D model data for use in the drawing is required to be selected in a range larger than a display range. As a result, the technique requires a complicated calculation process and an enormous process time, resulting in an increase in a memory capacity and an excessive load on a processor such as a Graphics Processing Unit (GPU).

The present invention has been made in view of the above circumstances, and an object of the present invention is to provide an image processor and an image processing method capable of reducing an image processing load.

An image processor of the present disclosure is configured to create a stereoscopic image projected on a predetermined projection plane from a predetermined virtual viewpoint based on an image signal output from a photographing device that captures a surrounding of a vehicle, the image processor includes a storage portion configured to store projection plane vertex information in which coordinate information of each vertex of a divided projection plane acquired by dividing the projection plane into a plurality of divided projection planes at a predetermined angle and identification information given to the divided projection plane are linked and coordinate transformation information of the coordinate information, an information control portion configured to specify all of the divided projection planes constituting a projection region of the stereoscopic image from the virtual viewpoint, to acquire the identification information of the specified divided projection plane, and to acquire the coordinate information of the vertex based on the acquired identification information from the storage portion, and a display control portion configured to coordinate-transform the coordinate information of each vertex of the divided projection plane acquired by the information control portion based on the coordinate transformation information of the storage portion, and to create the stereoscopic image based on the image signal output from the photographing device and the coordinate information after the coordinate transformation.

DESCRIPTION OF EMBODIMENT

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

Figure 1:
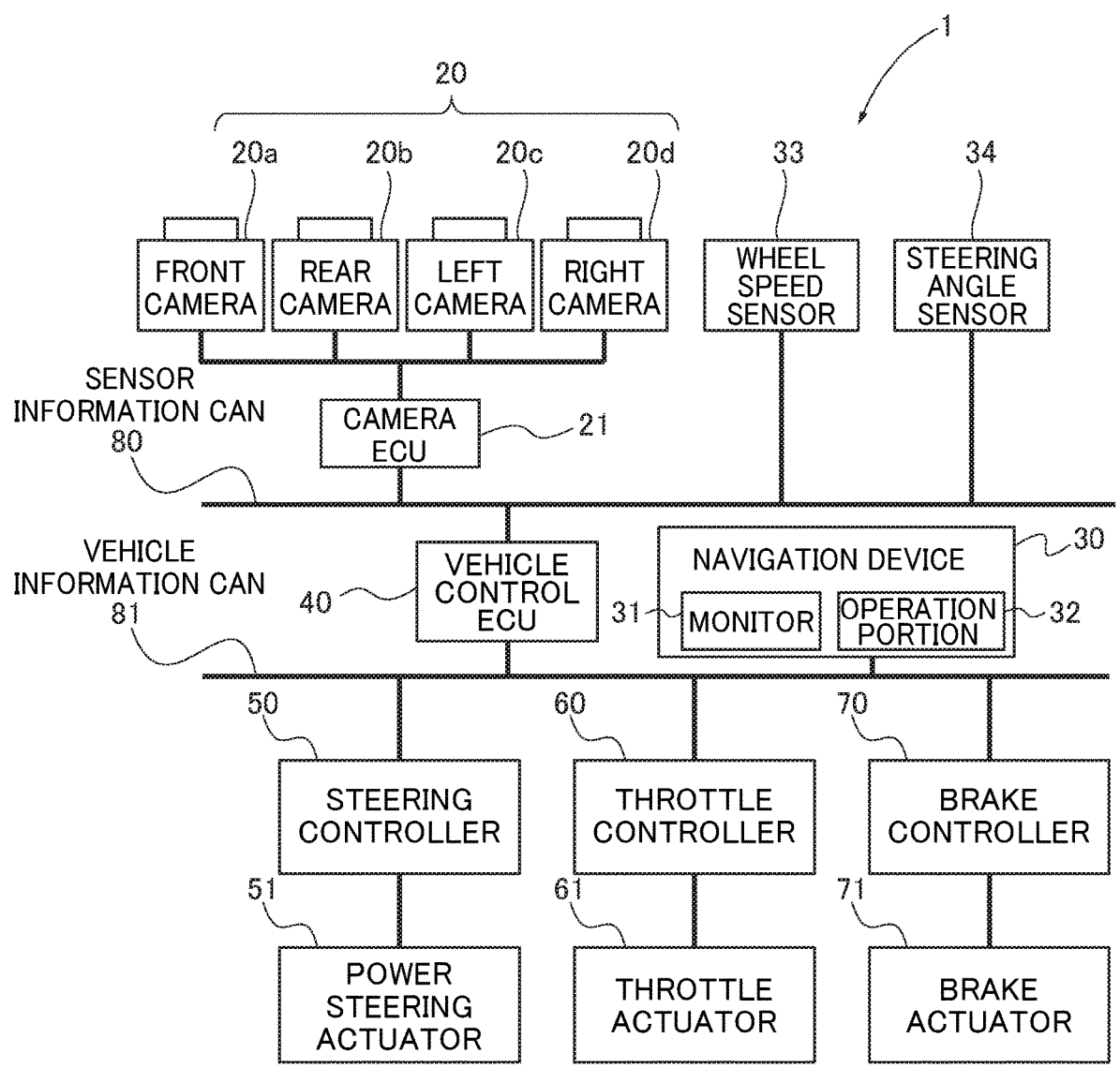
FIG. 1 is a block diagram illustrating a schematic configuration of a driving assist device to which an image processor of an embodiment of the present disclosure is applied.
Figure 2:
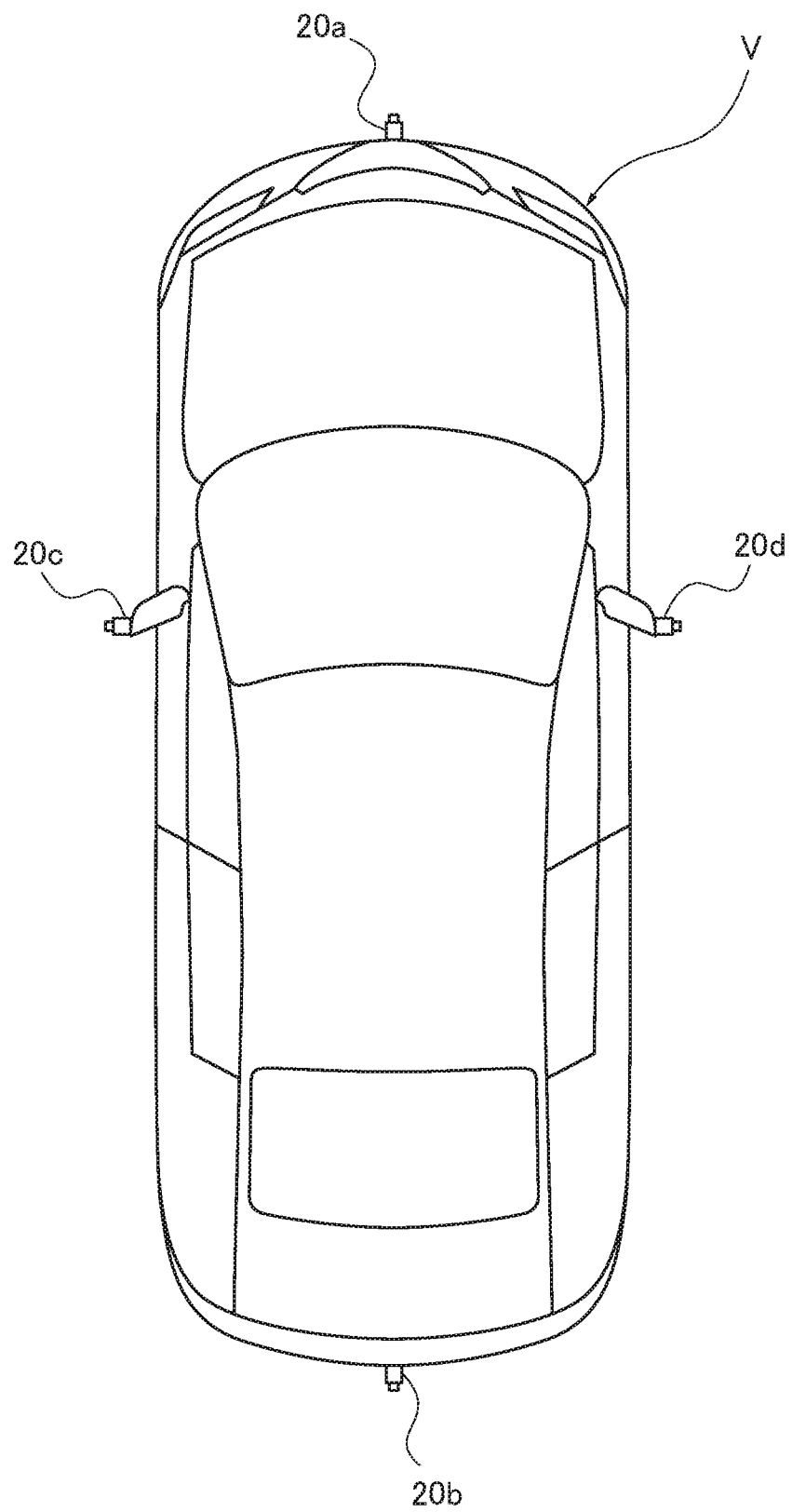
FIG. 2 is a view illustrating an example of positions of photographing devices of the driving assist device of the embodiment.

A schematic configuration of a driving assist device will be described. Hereinafter, an embodiment of the present disclosure will be described with reference to the drawings. FIG. 1 is a block diagram illustrating a schematic configuration of a driving assist device to which an image processor and an image processing method of the embodiment of the present disclosure are applied. FIG. 2 is a view illustrating an example of positions of photographing devices of the driving assist device of the embodiment.

As illustrated in FIG. 1, a driving assist device 1 is installed in a vehicle V (refer to FIG. 2), and executes a driving assist operation. More specifically, the driving assist device 1 creates a stereoscopic image (3D view image) form a predetermined virtual viewpoint based on an image of the surrounding of the vehicle V, and presents the stereoscopic image to a driver for assisting the driving of the vehicle V.

As illustrated in FIG. 2, a plurality of small cameras (photographing devices) are mounted on the front, back, right, and left portions of the vehicle V, respectively. More specifically, a front camera 20a is mounted on a front bumper or a front grille of the vehicle V to face the forward of the vehicle V. A rear camera 20b is mounted on a rear bumper or a rear garnish of the vehicle V to face the rear of the vehicle V. A left camera 20a is mounted on a left door mirror of the vehicle V to face the left side of the vehicle V. A right camera 20d is mounted on a right door mirror of the vehicle V to face the right side of the vehicle V.

Each of the front camera 20a, the rear camera 20b, the left camera 20c, and the right camera 20d is provided with a wide-angle lens or a fisheye lens for wide range observation. A region including a road surface around the vehicle V can be completely observed by the four cameras 20a to 20d. The cameras 20a to 20d are the photographing devices that capture or image the road surface around the vehicle V. Hereinafter, the cameras (photographing devices) 20a to 20d are simply described as a camera 20 without distinguishing the respective cameras 20a to 20d.

As illustrated in FIG. 1, the driving assist device 1 includes the front camera 20a, the rear camera 20b, the left camera 20c, the right camera 20d, a camera ECU 21, a navigation device 30, a wheel speed sensor 33, and a steering angle sensor 34.

The camera ECU 21 controls the camera 20 and also executes, for example, a creation process (coordinate transformation process) of a stereoscopic image by using information detected by the camera 20.

The navigation device (display device) 30 includes a monitor 31 having an image display function and an operation portion 32 with which a user performs an input operation. The navigation device 30 includes a storage portion that stores, for example, map data for guiding a route. The navigation device 30 shows a route to a destination set by an operator of the navigation device 30 based on the map data and a present position of the vehicle V detected by a GPS device (not shown), for example.

Various images during a route guidance operation are displayed on the monitor 31. This monitor 31 is a touch panel display in which a touch panel operation portion is superimposed onto a display surface on which, for example, an image is displayed. The operation portion 32 includes a touch panel of the monitor 31, a joy stick provided around the monitor 31, and/or various operation buttons. A user such as a driver gives a predetermined instruction to each portion of the driving assist device 1 through the navigation device 30 by the operation of the operation portion 32. The operation portion 32 receives the operation input of a user, and creates virtual camera information (virtual viewpoint information) to be output to an image processor 100. The operation portion 32 thereby operates as an input portion of the virtual camera information to the image processor 100. The details of the virtual camera information will be described later.

The wheel speed sensor 33 detects a wheel speed of the vehicle V. The information (wheel speed) detected by the wheel speed sensor 33 is input to a vehicle control ECU 40.

The steering angle sensor 34 detects a steering angle of the vehicle V. The steering angle sensor 34 outputs a rotation angle from a neutral position (0 degree) as the steering angle. The steering angle when the vehicle V travels straight is set as the neutral position (0 degree). The information (steering angle) detected by the steering angle sensor 34 is input to the vehicle control ECU 40.

The driving assist device 1 further includes the vehicle control ECU 40, a steering controller 50, a throttle controller 60, and a brake controller 70.

The vehicle control ECU 40 includes a microcomputer as a main body that has a Central Processing Unit (CPU), a Read Only Memory (ROM), and a Random Access Memory (RAM). The vehicle control ECU 40 controls the driving of a power steering actuator 51, a throttle actuator 61, and a brake actuator 71 based on each detected information input from the wheel speed sensor 33 and the steering angle sensor 34, and executes various processes that assist the driving of the vehicle V.

More specifically, when a driver starts the driving assist device 1 by turning on an automatic parking start switch (not shown), for example, the vehicle control ECU 40 executes an automatic parking process for automatically parking the vehicle V in a parking frame detected by the camera ECU 21.

The steering controller 50 controls the steering angle of the vehicle V by driving the power steering actuator 51 based on the vehicle control information determined by the vehicle control ECU 40.

The throttle controller 60 controls the throttle of the vehicle V by driving the throttle actuator 61 based on the vehicle control information determined by the vehicle control ECU 40.

The brake controller 70 controls the brake of the vehicle V by driving the brake actuator 71 based on the vehicle control information determined by the vehicle control ECU 40.

The camera ECU 21, the wheel speed sensor 33, the steering angle sensor 34, and the vehicle control ECU 40 are connected by a sensor information Controller Area Network (CAN) (registered trademark) 80 which is an interior Local Area Network (LAN).

The steering controller 50, the throttle controller 60, the brake controller 70, and the vehicle control ECU 40 are connected by a vehicle information CAN (registered trademark) 81 which is the interior LAN.

In the driving assist device 1 having the above configuration, the image processor 100 that executes the image processing method of the embodiment is mainly constituted by the camera ECU 21. Hereinafter, the functional configuration of the image processor 100 will be described in detail.

Figure 3:
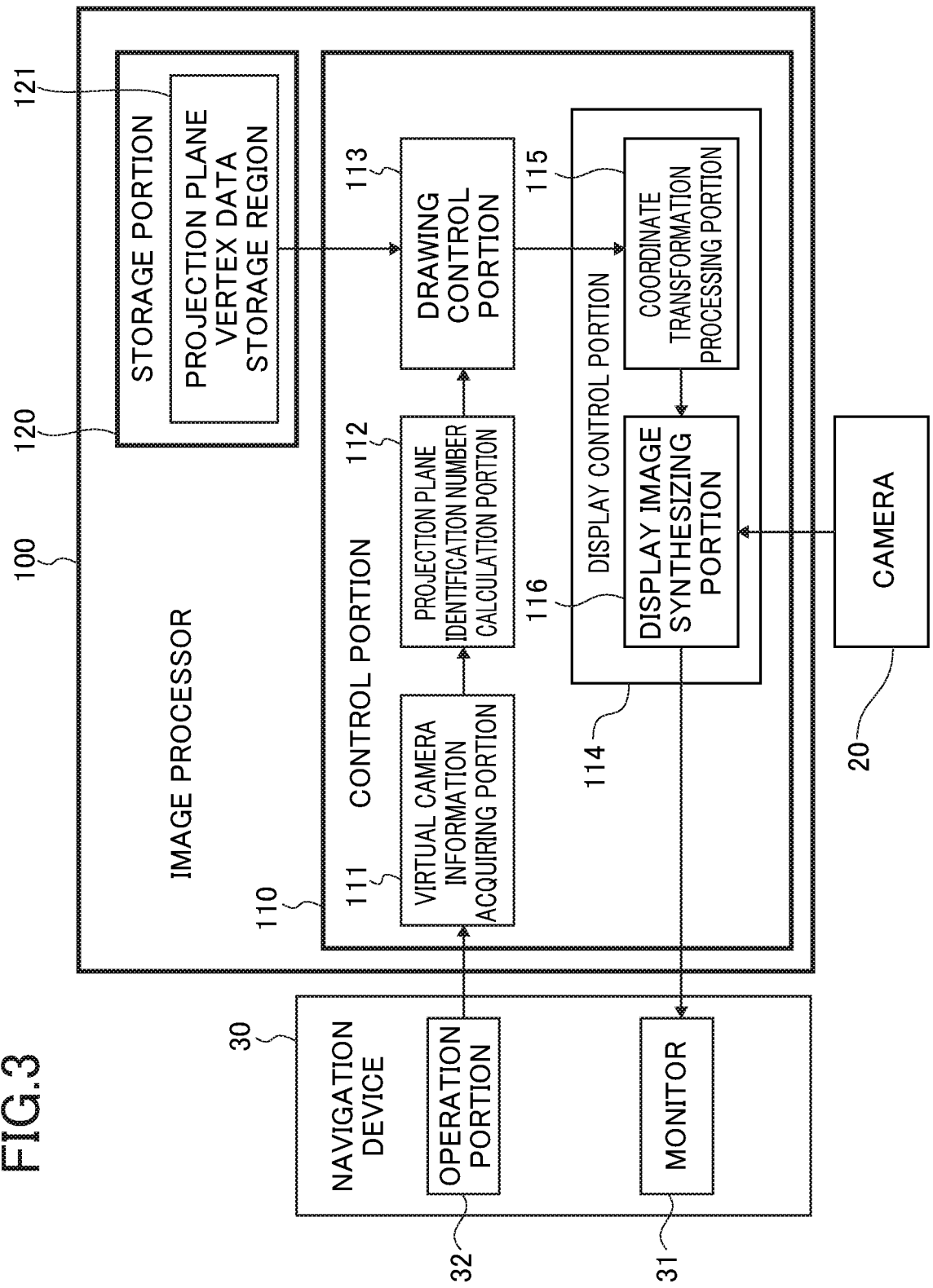
FIG. 3 is a functional block diagram illustrating a schematic configuration of an image processor of the embodiment.

The functional configuration of the image processor will be described. FIG. 3 is a functional block diagram illustrating a schematic configuration of the image processor 100 of the embodiment. As illustrated in FIG. 3, the image processor 100 of the embodiment includes a control portion 110 and a storage portion 120.

The control portion 110 mainly constituted by the camera ECU 21 controls the entire image processor 100. The control portion 110 includes a CPU and a calculation element. The calculation element is represented by an integrated circuit including a programmable logic device such as an FPGA, a Graphics Processing Unit (GPU, drawing portion), and an ASIC. In this embodiment, it is preferable for the control portion 110 to have a GPU specified in an image process and a calculation element (for example, FPGA) capable of calculating at high speed, in order to execute a 3D graphic image process at high speed.

The storage portion 120 of the image processor 100 includes a projection plane vertex data storage region 121. The projection plane vertex data storage region 121 stores projection plane vertex data in which the coordinate data of each vertex 202 of an after-described divided projection plane 201 is linked with an identification number given to the divided projection plane 201. The storage portion 120 stores, for example, coordinate transformation information for use in the coordinate transformation process, various information for use in the image process, and a parameter.

The storage portion 120 further stores a control program (image process program). This control program is executed by the control portion 110 at the startup of the image processor 100, so that the image processor 100 includes the functional configuration illustrated in FIG. 3.

More specifically, the control portion 110 includes a virtual camera information acquiring portion 111, a projection plane identification number calculation portion 112, a drawing control portion 113, and a display control portion 114. The virtual camera information acquiring portion 111, the projection plane identification number calculation portion 112, and the drawing control portion 113 operate as the information control part. The display control portion 114 includes a coordinate transformation processing portion 115 and a display image synthesizing portion 116. The display control portion 114 is constituted by a GPU.

Figure 4:
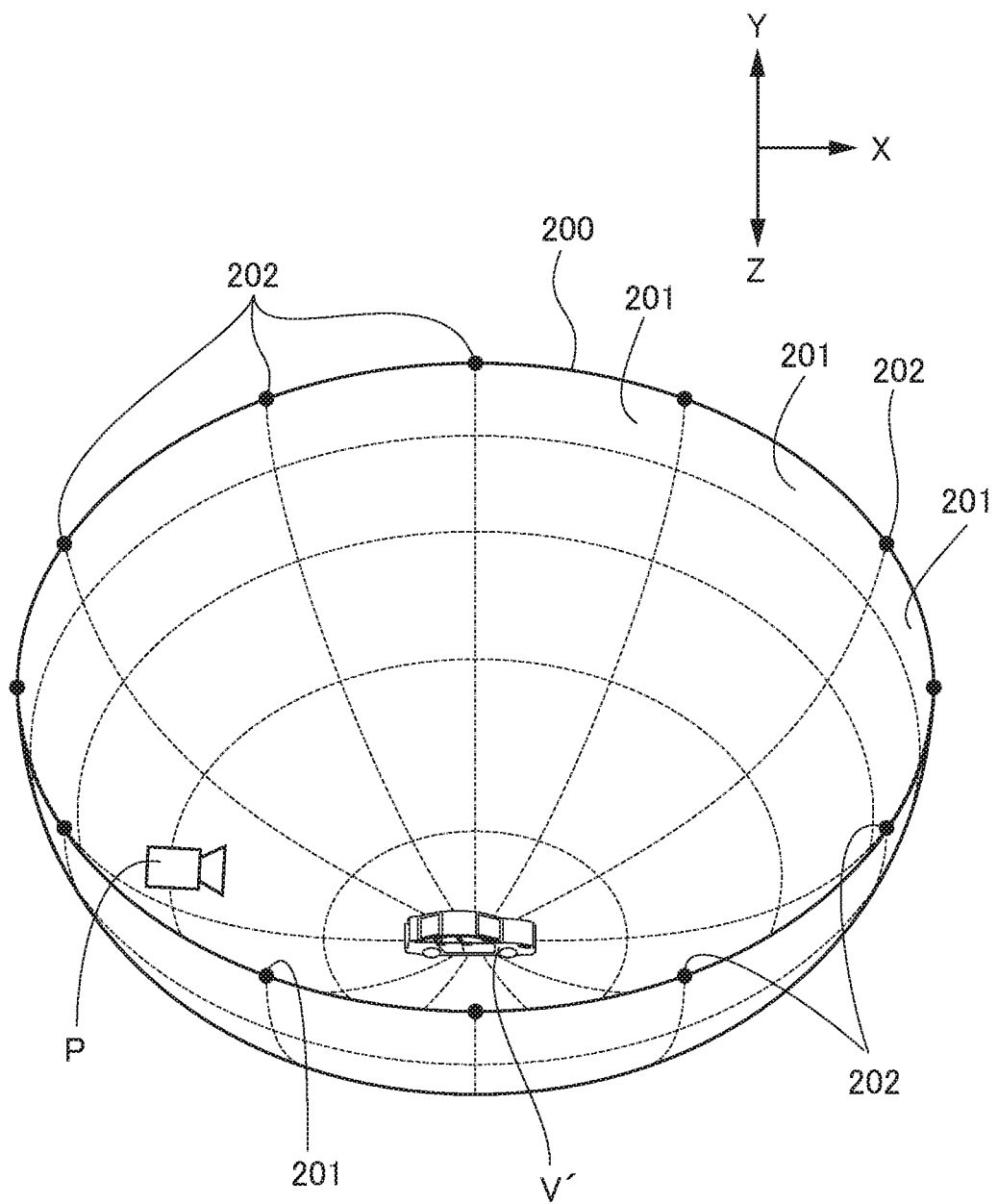
FIG. 4 is a view illustrating an image of a hemisphere (bowl shape) projection plane for use in the image processor of the embodiment.

In the image processor 100 of the embodiment, as illustrated in FIG. 4, a hemisphere (blow shape) projection plane 200 with a vehicle model V' as a center is assumed as a 3D model (space model) that projects a 3D image. The hemisphere projection plane 200 includes the center of the hemisphere as a zenith, a vertical direction passing through the zenith as a Y axis, an axis orthogonal to the Y axis as an X axis, and an axis orthogonal to the X axis and the Y axis as a Z axis (refer to FIGS. 4, 5, 8, for example).

The virtual camera information acquiring portion 111 acquires virtual camera information from the operation portion 32 as an input portion. The virtual camera information acquiring portion 111 outputs the acquired virtual camera information to the projection plane identification number calculation portion 112. The virtual camera information relates to a virtual camera P virtually installed in a predetermined virtual viewpoint.

The virtual camera information for use in the embodiment includes a position coordinate (X coordinate, Y coordinate, and Z coordinate) on the 3D model of the virtual camera P, a visual line direction (display direction) of the virtual camera P, and a viewing angle. The visual line direction is set as a directional vector calculated from a position and an angle (roll angle, pitch angle, and yaw angle) of the camera 20 or a vector obtained from the position of the virtual camera P and a fixation point of the virtual camera P. The angle or the fixation point is obtained from the operation direction or the operation amount of the operation portion 32. The fixation point of the virtual camera P for use herein is meant to be a coordinate representing a place where a user wishes to see.

The virtual camera (virtual viewpoint) P can be set in any position in a three-dimensional space of the hemisphere projection plane 200. A user can set a desired position (virtual viewpoint) and a desired visual line direction (display direction) of the virtual camera P when displaying the stereoscopic image on the monitor 31 by operating the operation portion 32. More specifically, for example, when a user operates (touch, drag, swipe, or flick) the touch panel of the operation portion 32 vertically and horizontally or operates a joy stick or the like, a user can designate the position of the virtual viewpoint, and select a desired visual line direction. The operation portion 32 acquires this operation by a user, and creates virtual camera information to be output to the virtual camera information acquiring portion 111.

The projection plane identification number calculation portion 112 specifies, among the divided projection planes 201 acquired by dividing the hemisphere projection plane 200 at each predetermined angle, all of the divided projection planes 201 constituting the projection plane 200 of the projection region of the stereoscopic image based on the virtual camera information from the virtual camera information acquiring portion 111, and calculates the identification information given to the specified divided projection planes 201. The projection plane identification number calculation portion 112 outputs the calculated identification information to the drawing control portion 113.

Figure 5:
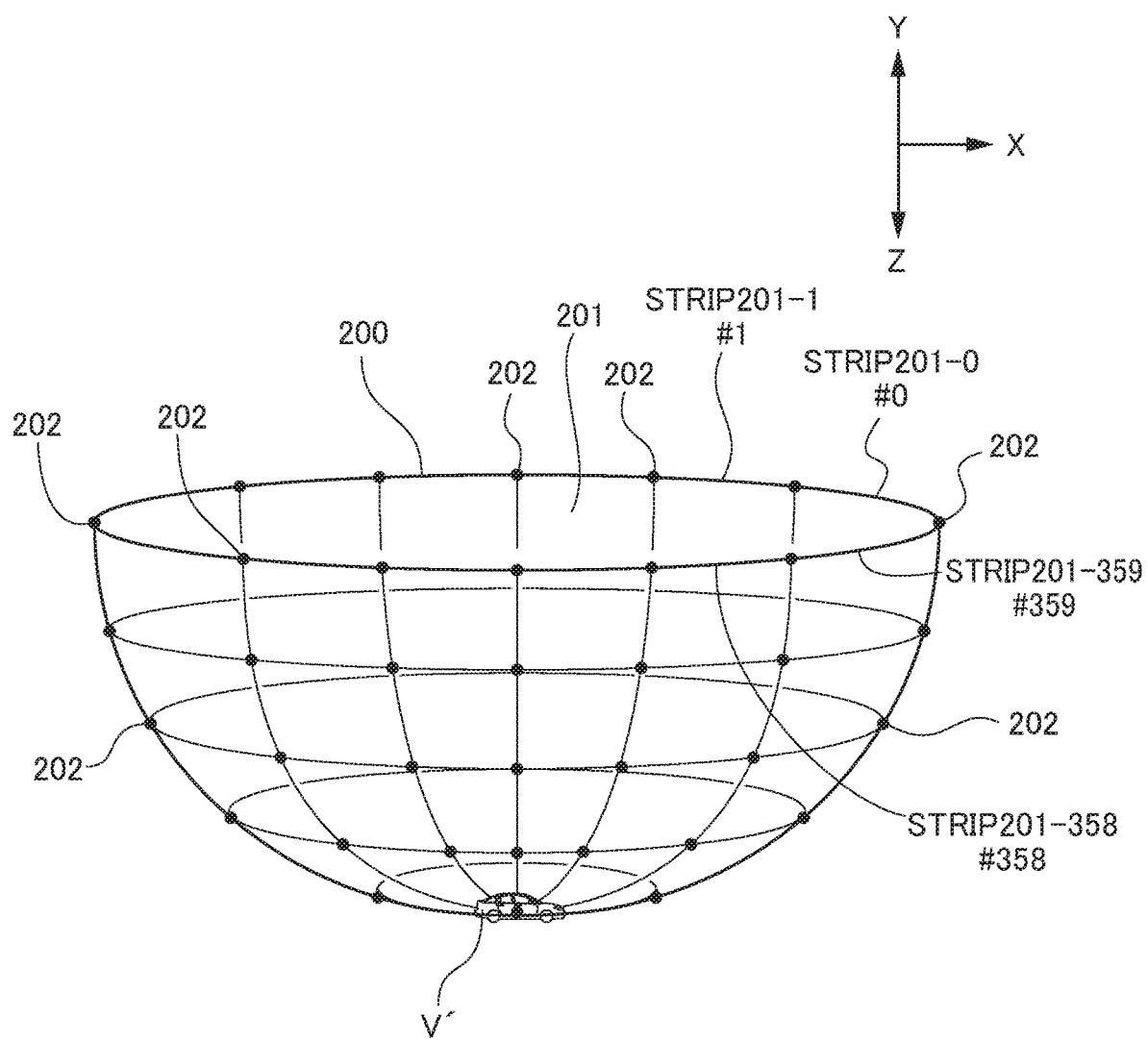
FIG. 5 is a schematic view illustrating a projection plane divided into a plurality of divided projection planes (strips) and vertices of the divided projection planes.
Figure 6A:
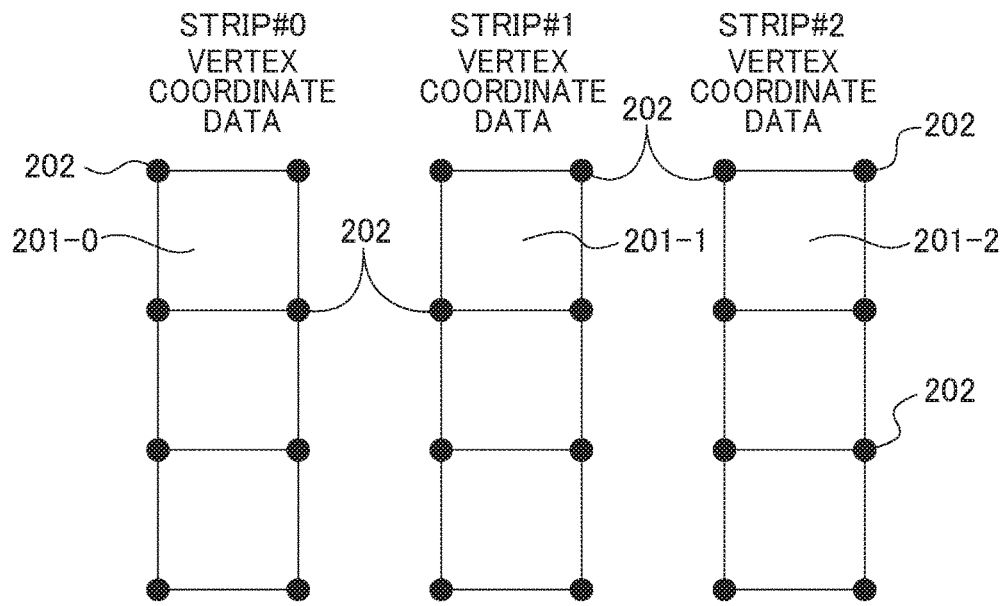
FIG. 6A is a view describing coordinate data of each vertex of the divided projection plane stored in a projection plane vertex data storing region of a storage portion, and illustrating a schematic view of the divided projection planes (strips) having a plurality of vertices.

As illustrated in FIGS. 5, 6A, the projection plane 200 includes a plurality of fine 3D models, i.e., the divided projection planes 201 divided at each predetermined angle in the vertical direction. The divided projection plane 201 has a strip shape (refer to FIG. 6A). Hereinafter, the divided projection plane 201 may be referred to as "Strip 201", and is shown as "Strip 201" in FIG. 6A.

In the example illustrated in FIGS. 5, 6A, the projection plane 200 is divided at one degree intervals about Y-axis (horizontal direction) to provide the 360 divided projection planes (strips) 201. In such a projection plane 200, the stereoscopic image can be created by moving the visual line direction of the virtual camera P at one degree intervals about the Y axis. The stereoscopic image thus corresponds to the visual line direction of the virtual camera P.

Each divided projection plane 201 is previously given with the identification number (strip number) as the identification information. In the example of FIG. 5, for example, each divided projection plane 201 is given with the same number as the angle from the X axis. In particular, the identification number of the divided projection plane 201 at 0 degree to the X axis is 0 (#0, strip 201-0), and the identification number of the divided projection plane 201 at 1 degree to the X axis is 1 (#1, strip 201-1). The identification number is similarly given to all of the divided projection planes 201. The identification number of the divided projection plane 201 at 359 degrees to the X axis is 359 (#359, strip 201-359).

As described above, it is desirable to match the angle and the identification number of the divided projection plane 201, in order to improve the access speed of the storage portion 120 and to facilitate the linking. In the embodiment, the projection plane 200 is divided into the 360 divided projection planes 201, and the divided projection planes 201 are given with the identification numbers from 0 to 359. However, the embodiment is not limited thereto. As another different embodiment, for example, the projection plane 200 may be divided at each smaller angle, i.e., 0.5 degrees, and the identification numbers may be given such as 0 to 0 degree, 1 to 0.5 degrees, 2 to 1 degree, and 3 to 1.5 degrees, for example. The projection plane 200 may be divided at each larger angle, i.e., 5 degrees, and the identification numbers may be given such as 0 to 0 degree, 1 to 5 degrees, 2 to 10 degrees, and 3 to 15 degrees, for example.

Figure 6B:
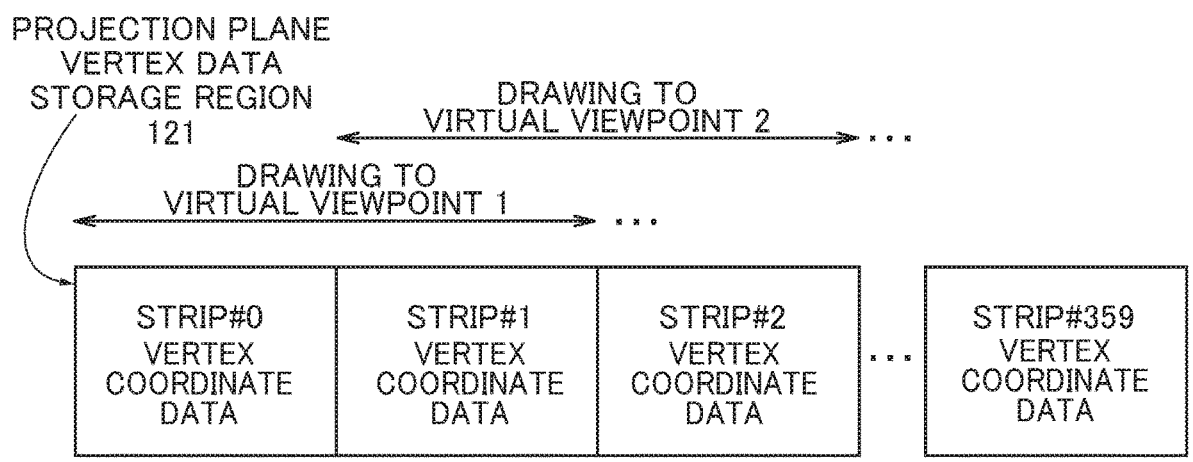
FIG. 6B is a view describing coordinate data of each vertex of the divided projection plane stored in the projection plane vertex data storing region of the storage portion, and illustrating a data configuration of the projection plane vertex data storing region.

The divided projection plane 201 includes a plurality of vertices 202, 202 . . . (refer to FIGS. 5, 6A). The data (projection plane vertex data) of the coordinates (X coordinate, Y coordinate, and Z coordinate) of these vertices 202 is stored in the projection plane vertex data storage region 121 of the storage portion 120. As illustrated in FIG. 6B, the coordinate data of all vertices 202 of the strip 201-0 with the identification number 0 is sequentially stored, and then the coordinate data of all vertices 202 of the strip 201-1 with the identification number 1 is sequentially stored in the projection plane vertex data storage region 121, so that the coordinate data of the respective vertices 202 from the strip 201-0 with the identification number 0 to the strip 201-359 with the identification number 359 is continuously stored in series.

The drawing control portion 113 acquires the coordinate data of the vertex 202 of the divided projection plane 201 corresponding to the identification number from the projection plane vertex data storage region 121 of the storage portion 120 based on the identification number input from the projection plane identification number calculation portion 112, and outputs the coordinate data to the display control portion 114 together with a GPU set value.

More specifically, the drawing control portion 113 outputs an initial address of the projection plane vertex data storage region 121 and the number of vertices 202 to the display control portion 114 (GPU). The initial address indicates an area in which the coordinate data of the vertex 202 of the divided projection plane 201 corresponding to each calculated identification number is stored.

Here, a conventional method of transmitting coordinate data of a vertex of a projection plane to a GPU includes a batch transmission method of coordinate data of all vertices of a projection plane to a GPU. However, as this method transmits all coordinate data to the GPU regardless of a visual field of a virtual camera P, the GPU has an enormous load and also unnecessary coordinate data of vertices which has no relationship with the visual field.

On the other hand, in the embodiment, the projection plane 200 is divided into a plurality of planes, and the coordinate data of the divided projection plane 201 corresponding to the projection region of the stereoscopic image is only transmitted to the display control portion 114 (GPU). The load of the GPU is thereby lowered, and the calculation process can be executed at faster speed.

The coordinate transformation processing portion 115 of the display control portion 114 acquires, from the projection plane vertex data storage region 121, the coordinate data of the vertex 202 to each identification number based on the number of vertices 202 and the initial address for each identification number input from the drawing control portion 113. The coordinate transformation processing portion 115 then executes the coordinate transformation process to the acquired coordinate data. In the coordinate transformation processing portion 115, the coordinate data of the vertex 202 of each divided projection plane 201 is previously associated with the coordinate transformation information (including transformation formula) with a table, for example.

The display image synthesizing portion 116 acquires the coordinate data coordinate-transformed by the coordinate transformation processing portion 115 and the image signal (captured image) from the camera 20, and creates a stereoscopic image to be displayed on the monitor 31 based on these. The display image synthesizing portion 116 outputs the display control signal for displaying the stereoscopic image to the navigation device 30 (monitor 31).

The operation of the image processor will be described. Next, an example (image processing method) of the operation of the image processor 100 of the embodiment will be described with reference to the flowcharts of FIGS. 7A to 7C and the views of FIGS. 8 to 10.

Figure 7A:
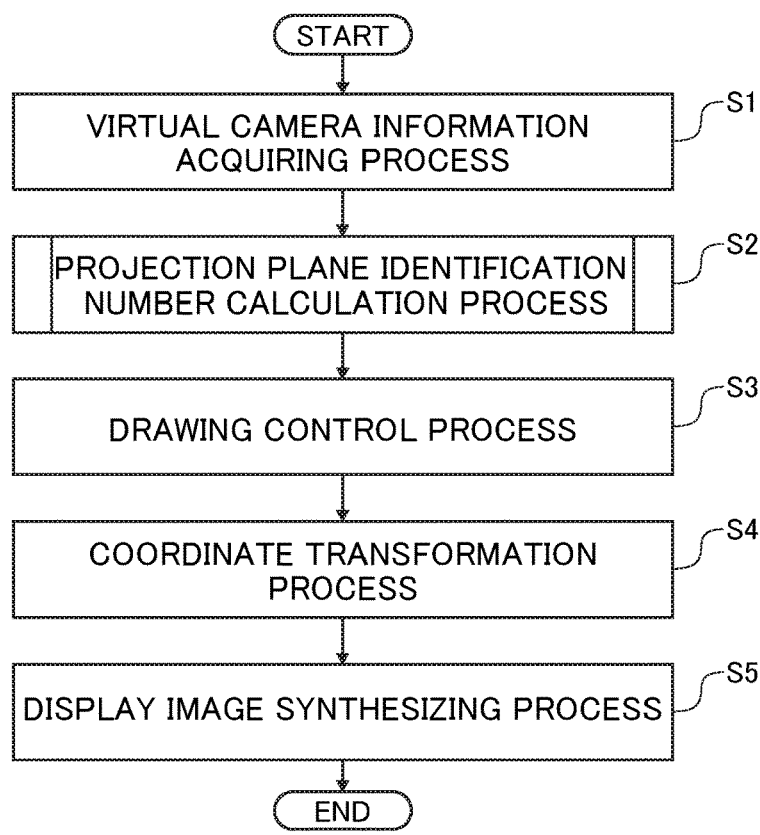
FIG. 7A is a flowchart describing an example of an operation of the image processor of the embodiment, and illustrating an entire flow of an image process.

FIG. 7A is a flowchart describing the entire operation of the image processor 100. When a driver operates the touch panel operation portion 32 of the monitor 31 to input an instruction for starting the display of the stereoscopic image, the operation shown in the flowchart of FIG. 7A starts.

In a virtual camera information acquiring process of Step S1, the virtual camera information acquiring portion 111 of the control portion 110 of the image processor 100 acquires the virtual camera information from the operation portion 32 of the navigation device 30. The virtual camera information is the position coordinate, the visual line direction, and the viewing angle of the virtual camera (virtual viewpoint) P.

Figure 8:
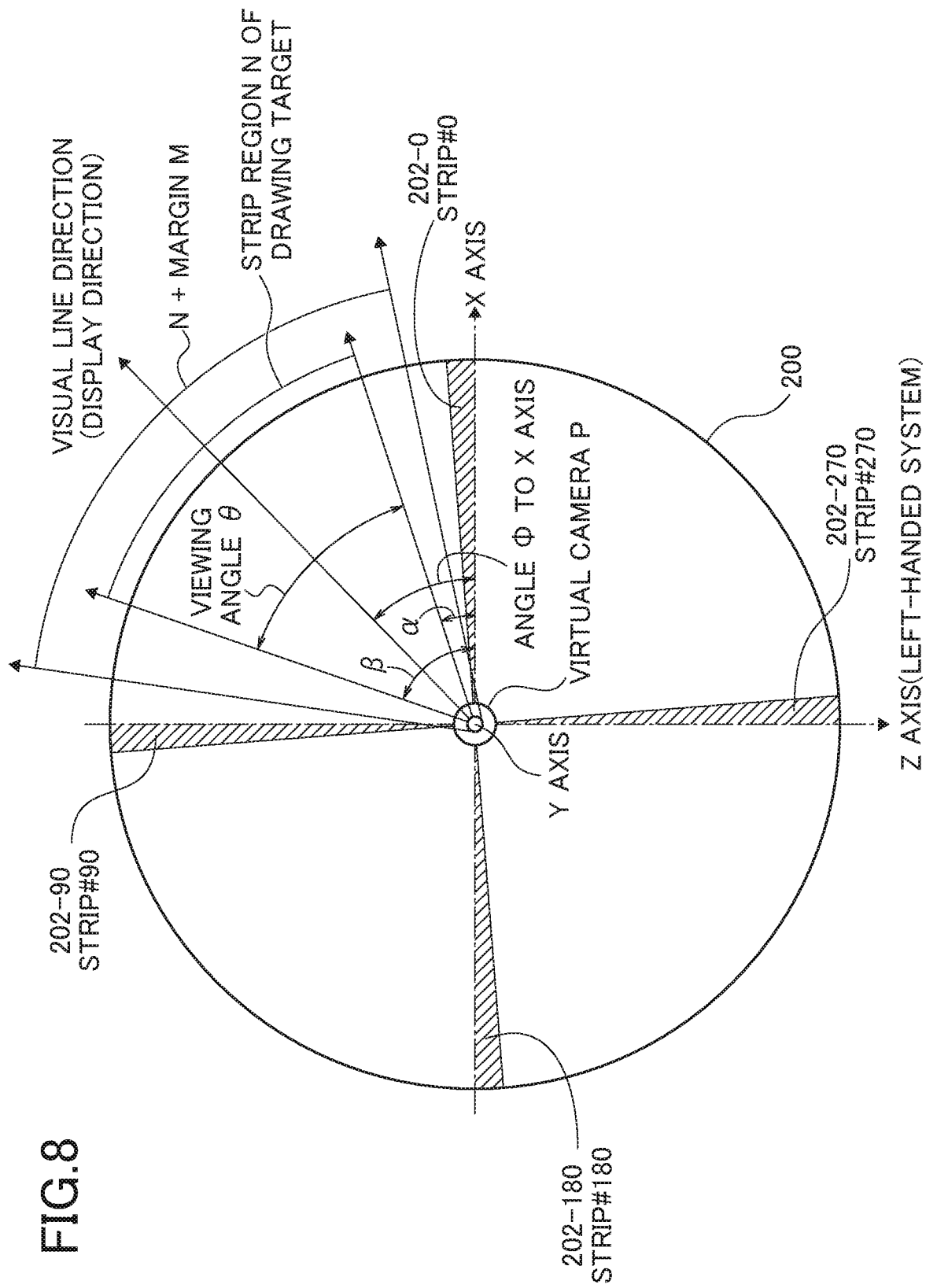
FIG. 8 is a view describing an embodiment of an identification number calculation process which is executed in the image processor of the embodiment.

The viewing angle is previously determined by the camera 20 to be used. In FIG. 8, θ denotes the viewing angle. On the other hand, the position coordinate and the visual line direction (direction shown by allow in FIG. 8) of the virtual camera P may be arbitrary set when a user operates the operation portion 32 as described above. Before a user operates the operation portion 32, i.e., after the start of the process, the previously determined coordinate data, for example, the position coordinate at a predetermined height just above the vehicle V, i.e., a predetermined position coordinate (0, Y, 0) on the Y axis is set as the initial value of the position coordinate of the virtual camera P. In addition, the Y coordinate may be fixed. A direction along the X axis, for example, is set as the initial value of the visual line direction.

Next, in a projection plane identification number calculation process of Step S2, the projection plane identification number calculation portion 112 calculates, among the identification number (strip number) given to the divided projection planes 201, the identification numbers of all of the divided projection planes 201 constituting the projection region of the stereoscopic image based on the position coordinate, the visual line direction, and the viewing angle θ of the virtual camera P acquired in Step S1. The projection region can be calculated based on the visual line direction and the viewing angle.

An embodiment of the calculation procedure of the identification number by the projection plane identification number calculation portion 112 will be described with reference to FIGS. 7B, 8. FIG. 8 is a top view of the projection plane 200 from its zenith. In FIG. 8, the virtual camera P is located in a fixed position "0, Y, 0" on the Y-axis.

Figure 7B:
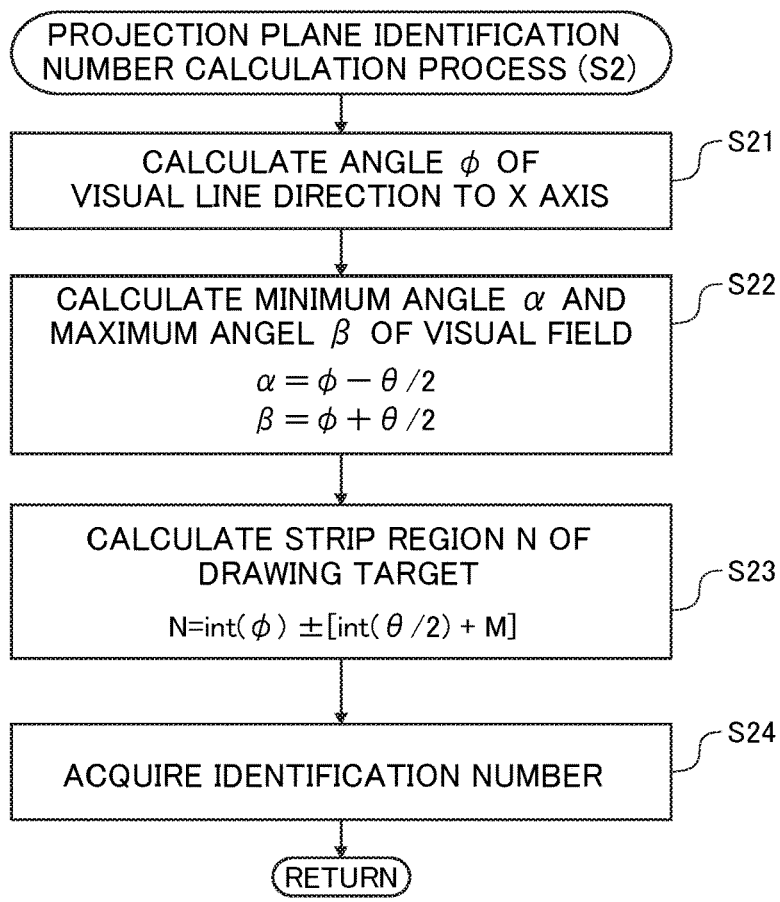
FIG. 7B is a flowchart describing a flow of an embodiment of a projection plane identification number calculation process.

As illustrated in FIG. 7B, in Step S21, an angle φ of the visual line direction relative to the X axis (reference direction) is calculated based on the visual line direction (display direction) of the virtual camera information (refer to FIG. 8). Next, in Step S22, a minimum angle α and a maximum angle β of the visual field relative to the X axis are obtained with the following equations (1), (2) from the viewing angle θ acquired in Step S1 and the angle φ calculated in Step S21.

$$\alpha = \varphi - \theta/2 \quad (1)$$

$$\beta = \varphi + \theta/2 \quad (2)$$

In the next Step S23, a strip region N of the drawing target (region including divided projection plane 201 corresponding to projection region from virtual camera P) is calculated with the following equation (3). More specifically, the minimum angle α and the maximum angle θ calculated with the equations (1), (2) in Step S22 are rounded off with the equation (3), and the region between the rounded off minimum angle and maximum angle is set as the strip region N. In this case, as illustrated in FIG. 8, the value of N may be adjusted by adding a predetermined margin M (adjustment value) to N (N+margin M). In the following equation (3), int ( ) is a function for calculating an integer by omitting a number after a decimal point, and M is a margin (adjustment value).

$$N = \text{int}(\varphi) \pm [\text{int}(\theta/2) + M] \quad (3)$$

In Step S24, the identification number of the divided projection plane 201 on which the stereoscopic image should be drawn is acquired based on the strip region N calculated by the above equation (3). Namely, the angle included in the strip region N is acquired as the identification number.

Hereinafter, specific examples 1, 2, 3 of the calculation procedure of the identification number will be described.

Specific Example 1: φ=45.0 (degree), θ=90.0 (degree), M=0 N=45±45=0, 90

The identification numbers 0 to 90 are thereby acquired.

Specific Example 2: φ=0.0 (degree), θ=180.0 (degree), M=0 N=0±90=−90, 90

The range between −90 degrees to 90 degrees, i.e., the identification numbers 0 to 90, and the identification numbers 270 to 359 are thereby acquired.

Specific Example 3: φ=1.5 (degree), θ=180.0 (degree), M=1 N=1±(90+1)=−90, 92 The range between −90 degrees to 92 degrees, i.e., the identification numbers 0 to 92 and the identification numbers 270 to 359 are thereby acquired.

Referring back to FIG. 7A, in the drawing control process of Step S3, the drawing control portion 113 acquires the coordinate data of the vertex 202 (in this case, initial address in storage region of coordinate data of each divided projection plane 201) from the projection plane vertex data storage region 121 of the storage portion 120 for the divided projection planes 201 corresponding to all of the identification numbers calculated in the above Step S2. The drawing control portion 113 outputs the acquired coordinate data (initial address) of each divided projection plane 201 and the number of vertices 202 to the coordinate transformation processing portion 115 of the display control portion 114 (GPU) together with the GPU set value.

In particular, the GPS set value includes the following.
[Matrix]: mainly used for coordinate transformation
    rotating matrix, enlargement/reduction matrixes, translation matrix
[Drawing Condition]
    transmission setting, setting of light (for example, intensity and direction of light), quality information of object In the coordinate transformation process of Step S4, the coordinate transformation processing portion 115 executes the coordinate transformation process based on the GPU set value to the coordinate data input from the drawing control portion 113 (coordinate data obtained from projection plane vertex data storage region 121 based on initial address of coordinate data of each identification and the number of vertices 202).

The display control portion 114 constituted by the GPU calculates the matrixes having the following meanings by combining three matrixes of the above rotating matrix, enlargement/reduction matrixes, and translation matrix in the drawing of the 3D view to be used. The coordinate transformation processing portion 115 of the display control portion 114 executes the coordinate transformation by multiplying these matrixes with the coordinate data of each vertex 202.
    model transformation matrix (transformation matrix for moving, rotating, enlarging/reducing model)
    view transformation matrix (matrix for transforming coordinate to set camera position as origin)
    projection transformation matrix (transformation matrix for perspective sensation)

Finally, in the display image synthesizing process of Step S5, the display image synthesizing portion 116 creates the stereoscopic image to be displayed on the monitor 31 based on the coordinate data transformed by the coordinate transformation processing portion 115 and the image signal (captured image data) acquired from the camera 20 capturing or imaging the surrounding of the vehicle V. When creating the stereoscopic image, a known method, for example, a texture mapping method may be used. The display image synthesizing portion 116 outputs the display control signal for displaying the created stereoscopic image to the navigation device 30.

In this case, in order to display the top view image of the vehicle V, for example, together with the stereoscopic image on the monitor 31, the display image synthesizing portion116 may create the overhead image based on the image signal of each camera 20, and also output the display control signal for displaying the overhead image to the navigation device 30.

Figure 9:
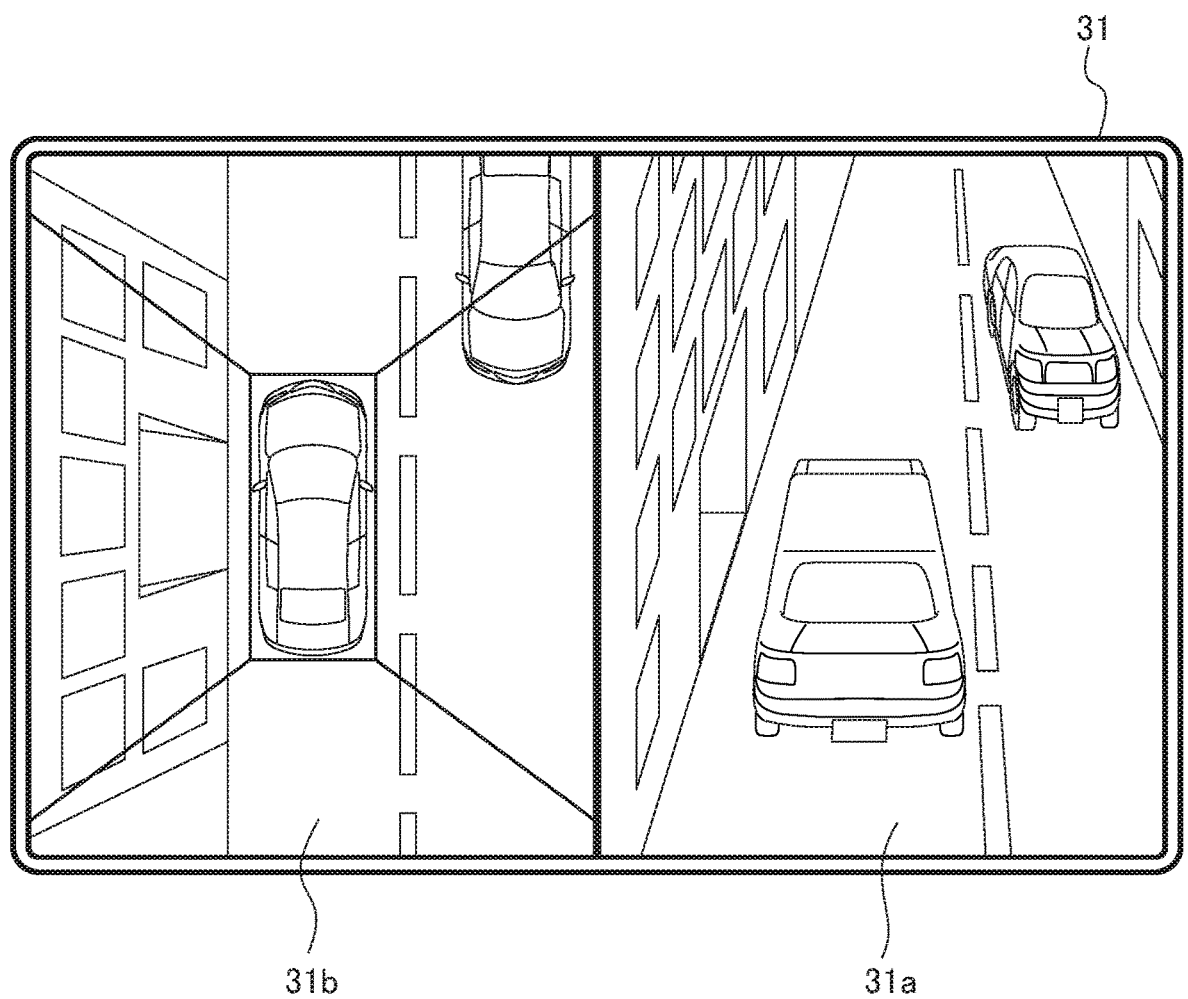
FIG. 9 is a view illustrating a display example of an image on a monitor of a navigation device.

In this way, the image process by the image processor 100 is completed. The navigation device 30 displays the image on the monitor 31 based on the display control signal input from the image processor 100. FIG. 9 shows a display example of the image on the monitor 31. In the example illustrated in FIG. 9, an overhead image 31b and a stereoscopic image 31a created by the image processor 100 are displayed side by side on the display surface of the monitor 31. A user can perform the parking by visually recognizing the stereoscopic image 31a while confirming a blind area in the parking, for example. Namely, the driving assistance is performed based on the stereoscopic image 31a.

When a user changes the position or the visual line direction of the virtual camera P in the Y axis direction by operating the touch panel on the stereoscopic image 31a displayed on the monitor 31, the operation portion 32 receives the operation, and outputs the changed virtual camera information to the image processor 100. In response to the input of the virtual camera information, the image processor 100 creates the stereoscopic image based on the changed virtual camera information by repeating the processes in Steps S1 to S5 of FIG. 7A, and outputs the display control signal to the navigation device 30. A user can thereby visually recognize the updated stereoscopic image in a desired visual line direction changed by a user.

The range of the coordinate data output to the coordinate transformation processing portion 115 by the drawing control portion 113 when the virtual camera P is moved from a certain virtual viewpoint (virtual viewpoint 1) to another virtual viewpoint (virtual viewpoint 2) is shown by the arrows above the data configuration of the projection plane vertex data storage region 121 in FIG. 6B. According to this example, in the case of the virtual viewpoint 1, the coordinate data of the vertices 202 of a predetermined number of the divided projection planes 201 from the identification number 0 is output. When the virtual viewpoint is moved to the virtual viewpoint 2 by the input operation from the operation portion 32, the coordinate data of the vertices 202 of a predetermined number of the divided projection planes 201 from the identification number 1 shifted by one degree is output.

Figure 10:
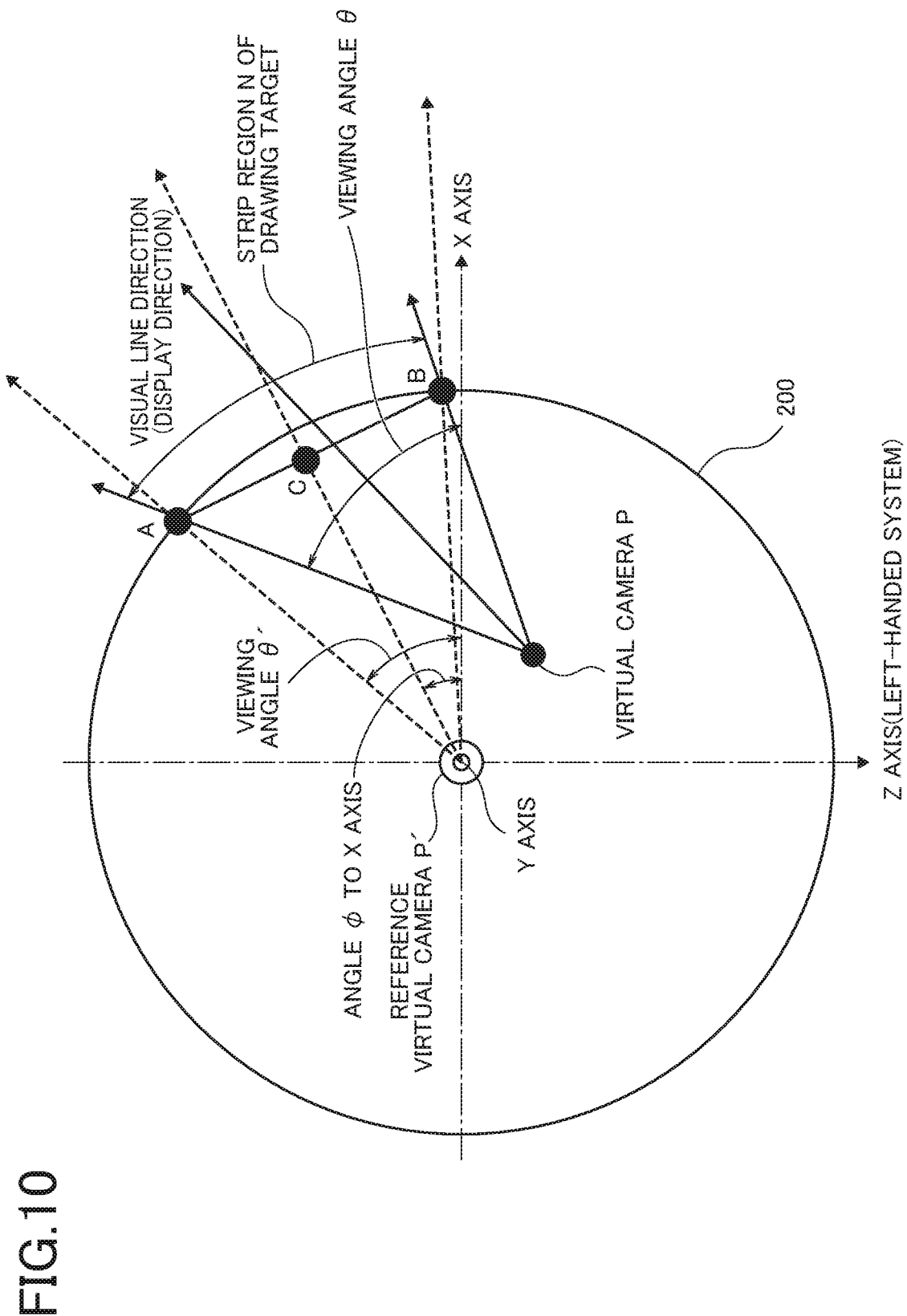
FIG. 10 is a view describing a modified example of the identification number calculation process which is executed in the image processor of the embodiment.

Next, a modified example (Step S2') of the calculation procedure of the identification number by the projection plane identification number calculation portion 112 will be described with reference to the flowchart of FIG. 7C and the view of FIG. 10. In the above, the calculation procedure of the identification number when the position coordinate of the virtual camera P is "(0, Y, 0)" on the Y axis and the visual line direction of the virtual camera P is arbitrary set is described with referent to FIG. 8. On the other hand, in the modified example, the position of the virtual camera P in the X, Y, and Z axis directions and the visual line direction of the virtual camera P can be arbitrary designated by a user's operation of the operation part 32. The calculation procedure of the identification number in this case will be described.

The position coordinate (X, Y, Z), the visual line direction, and the viewing angle θ of the virtual camera P acquired by the virtual camera information acquiring portion 111 are input to the projection plane identification number calculation portion 112.

Figure 7C:
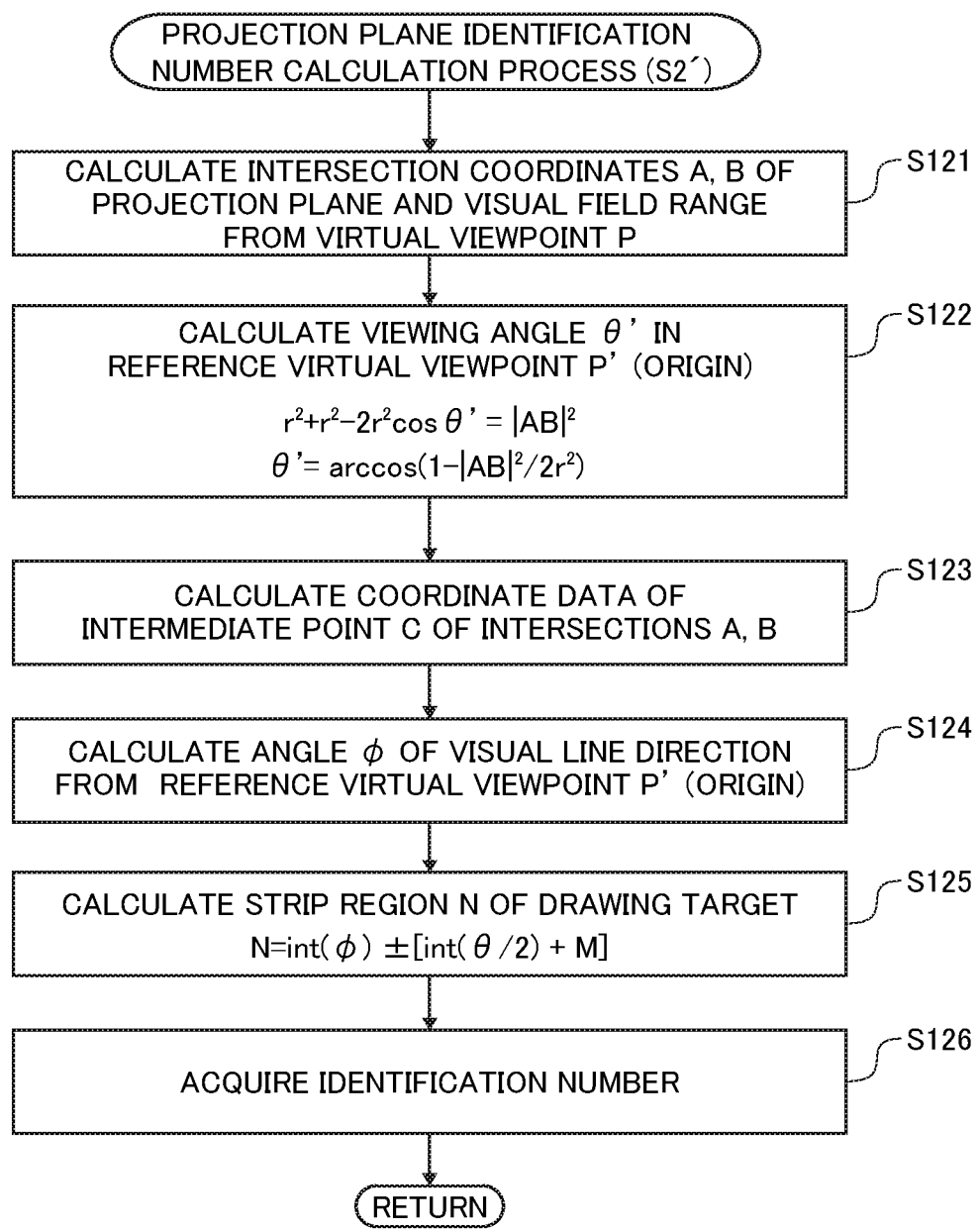
FIG. 7C is a flowchart describing a flow of a modified example of the projection plane identification number calculation process.

As illustrated in FIG. 7C, in Step S121, the projection plane identification number calculation portion 112 calculates the coordinate data of intersections A, B (refer to FIG. 10) of the projection plane 200 and the visual field of the virtual camera P based on the position coordinate (X, Y, Z) and the viewing angle θ of the virtual camera P.

Next, in Step S122, the projection plane identification number calculation portion 112 calculates a viewing angle θ' in a reference virtual camera P' (reference virtual viewpoint) located in the origin with the following equations (4), (5) based on the coordinate data of the intersections A, B calculated in Step S121. In the following equations (4), (5), r is a radius of the hemisphere projection plane 200 and AB is a distance between the intersections A, B.

$$r^2 + r^2 - 2r^2 \cos\theta' = |AB|^2 \qquad (4)$$

$$\theta' = \arccos(1 - |AB|^2/2r^2) \qquad (5)$$

Next, in Step S123, the projection plane identification number calculation portion 112 calculates the coordinate data of an intermediate point C of the intersections A, B based on the coordinate data of the intersections A, B calculated in Step S121. In the next Step S124, the projection plane identification number calculation portion 112 calculates the visual line direction from the reference virtual camera P' based on the coordinate data of the intermediate point C calculated in Step S123 and the coordinate data of the reference virtual camera P' (origin). Based on this visual line direction, the projection plane identification number calculation portion 112 calculates an angle φ of the visual line direction to the X axis.

Next, in Step S125, the projection plane identification number calculation portion 112 calculates a strip region N of the drawing target based on the angle φ regarding the visual line direction from the reference virtual camera P' (origin) calculated in Step S124 and the viewing angle θ' calculated in Step S122. The strip region N can be calculated with the calculation procedure similar to Step S23 of the embodiment with the above-described equation (3).

Accordingly, the image processor 100 creates the stereoscopic image by executing the drawing control process of Step S3, the coordinate transformation process of Step S4, and the display image synthesizing process of Step S5 in FIG. 7A based on the strip region N calculated as described above, and outputs the display control signal of the stereoscopic image to the navigation device 30. The stereoscopic image projected in a desired visual line direction from the virtual camera P in a desired position designated by a user is thereby displayed on the monitor 31.

The effects of the image processor will be described. As described above, the image processor 100 of the embodiment is configured to create the stereoscopic image projected onto a predetermined projection plane 200 from a predetermined virtual viewpoint based on the image signal output from the photographing device (camera 20) capturing or imaging the surrounding of the vehicle V. The image processor 100 includes the storage portion 120 that stores the projection plane vertex information in which the coordinate information and the identification information of each vertex 202 of a plurality of divided projection planes 201 acquired by dividing the projection plane 200 at a predetermined angle are linked and the coordinate transformation information. The image processor 100 further includes the information control portion (virtual camera information acquiring portion 111, projection plane identification number calculation portion 112, and drawing control portion 113) and the display control portion 114 (coordinate transformation processing portion 115 and display image synthesizing portion 115). The information control portion is configured to specify all of the divided projection planes 201 constituting the projection region of the stereoscopic image from the virtual viewpoint (virtual camera P), acquire the identification information of the specified divided projection planes 201, and acquire the coordinate information of the vertex 202 from the storage portion 120 based on the acquired identification information. The display control portion 114 is configured to coordinate-transform the coordinate information of each vertex of the divided projection plane based on the coordinate transformation information of the storage portion 120, and create the stereoscopic image based on the image signal output from the photographing device and the coordinate information after the coordinate transformation.

The image processing method executed by the image processor 100 of the embodiment includes a step of specifying all of the divided projection planes 201 constituting the projection region of the stereoscopic image from the virtual viewpoint (virtual camera P), a step of acquiring the identification information of the specified divided projection planes 201, a step of acquiring the coordinate information of the vertex 202 from the storage portion 120 based on the acquired identification information, a step of coordinate-transforming the coordinate information of each vertex 202 of the acquired divided projection plane 201 based on the coordinate transformation information, and a step of creating the stereoscopic image based on the image signal output from the camera 20 and the coordinate information after the coordinate transformation.

According to the embodiment, the coordinate transformation process is executed by dividing the projection plane 200 into a plurality of planes, and acquiring only the coordinate information of the divided projection planes 201 corresponding to the projection region from the virtual viewpoint from the storage portion 120. Accordingly, the load of the display control portion 114 constituted by the GPU can be significantly reduced, and thus, the load of the entire image process can be reduced. As a result, the stereoscopic image corresponding to the virtual viewpoint can be smoothly and accurately presented even when the virtual viewpoint is changed.

According to the embodiment, the projection plane 200 is constituted by the hemispherical projection plane. The hemispherical projection plane includes a plurality of divided projection planes 201 divided at predetermined angle (for example, one degree) intervals in the horizontal direction from the center of the hemisphere, and each divided projection plane 201 is given with the identification number as the identification information in ascending order. The correspondence between the identification number and the divided projection plane 201 is thereby simplified and clarified, and thus the load of the image process can be reasonably reduced, and the image process can be reasonably accelerated.

According to the embodiment, the information control portion acquires the virtual viewpoint information (virtual camera information) including the position coordinate, the visual line direction, and the viewing angle of the virtual viewpoint (virtual camera P) input from a predetermined input portion (for example, operation portion 32), calculates the angle of the visual line direction to a predetermined reference direction of the horizontal direction based on the position coordinate and the visual line direction of the virtual viewpoint, calculates the minimum angle and the maximum angle of the projection region to the reference direction based on the angle and the viewing angle, and calculates the identification information of all of the divided projection planes included in the projection region based on the minimum angle and the maximum angle. The specifying process of the divided projection plane can be therefore simplified, the calculation speed can be accelerated, and the load of the image process can be reduced.

In this case, the minimum angle and the maximum angle of the projection region may be calculated with the equation (3) as the above embodiment. When the position coordinate of the virtual viewpoint is arbitrary designated, the minimum angle and the maximum angle of the projection region may be calculated with the equation (3) after the visual line direction and the viewing angle from the virtual viewpoint are transformed into the visual line direction and the viewing angle from the origin with the equations (4), (5) as the modified example. In both cases, the divided projection plane 201 can be specified at high speed with a simple calculation formula, and the load of the image process can be reduced.

As described above, the embodiment and the modified example of the present disclosure are described with reference to the drawings. However, the specific configuration is not limited to the embodiment and the modified example. Any design change without departing from the gist of the present disclosure is included in the present disclosure.

In the above embodiment and the modified example, as the divided projection plane 201 (strip), the 3D model data is used as it is for drawing. However, it is not limited to this method. As another different embodiment, the image processor and the image processing method may be configured to calculate the identification number of the projection target (drawing target) only, and to draw arbitrary 3D model data previously assigned to each identification number.

In the above embodiment, the stereoscopic image to be projected is updated by changing the divided projection plane 201 of the projection plane by one each, namely, at one degree intervals based on one change instruction of the visual line direction from the virtual viewpoint input from the input portion. However, it is not limited thereto. As another different embodiment, for example, the stereoscopic image may be updated by changing the visual line direction with the angle according to the input condition of the change instruction from the input portion such as the operation speed of the operation portion 32 by a user, in particular, the speed and the operation amount of the dragging operation or the flick operation on the touch panel. For example, the stereoscopic image from each visual line direction may be updated by changing the visual line direction at one degree intervals to shift the divided projection plane 201 by one each when the operation speed is slow or the operation distance of the dragging, for example, is short. On the other hand, the stereoscopic image from each visual line direction may be updated by changing the visual line direction at five degree intervals to shift the divided projection plane 201 by five each when the operation speed is fast or the operation distance of the dragging, for example, is long. Thereby, even when a GPU having a relatively low performance is used, the stereoscopic image may be updated by following a user's operation.

According to the above embodiment, the projection region from the virtual viewpoint, namely, the position and the visual line direction of the virtual camera are changed according to a user's input operation from the operation portion 32. However, it is not limited thereto. As another different embodiment, for example, the projection region from the virtual viewpoint may be changed according to the traveling condition of the vehicle V. More specifically, the position and the visual line direction of the virtual camera P may be automatically changed based on the steering angle of the vehicle V detected by the steering angle sensor 34, and the stereoscopic image may be created based on the changed position and visual line direction. In this case, the steering angle sensor 34 operates as one of the input portions for the virtual camera information. The appropriate stereoscopic image corresponding to the traveling direction and the steering direction of the vehicle V is thereby automatically displayed.

As another different embodiment, for example, when the visual line direction of the virtual camera P is changed by following the steering angle of the vehicle V detected by the steering angle sensor 34, the angle may be changed according to the wheel speed detected by the wheel speed sensor 33, i.e., the vehicle speed. In this case, the steering angle sensor 34 and the wheel speed sensor 33 operate as one of the input portions for the virtual camera information.

With this configuration, for example, at a predetermined vehicle speed or below, the stereoscopic image is updated by moving the divided projection plane 201 of the projection region at one degree intervals. Therefore, in the low speed traveling at the predetermined vehicle speed or below, a fine stereoscopic image can be presented to a user. On the other hand, when the vehicle speed exceeds the predetermined vehicle speed, the stereoscopic image is updated by moving the divided projection plane 201 of the projection region by five degree intervals. The stereoscopic image can be thereby rapidly updated by following high speed traveling to be presented to a user.

The stereoscopic image created by the image processor 100 and the image processing method of the embodiment may be used as an image for an electric mirror. In the embodiment, the divided projection plane 201 suitable for a viewing angle is selected to create the stereoscopic image, and to reduce the load of the image process (in particular, GPU). Accordingly, even when the stereoscopic image created by the image processor 100 and the image processing method of the embodiment is applied for creating the image for an electric mirror, the load of the image process can be reduced, and a suitable electric mirror image can be presented to a driver.

The invention claimed is:

1. An image processor configured to create a three dimensional (3D) view image projected on a predetermined projection plane from a predetermined virtual viewpoint based on an image signal output from a photographing device that captures a surrounding of a vehicle, the image processor comprising:
   a storage portion configured to store projection plane vertex information in which coordinate information of each vertex of a divided projection plane acquired by dividing the projection plane into a plurality of divided projection planes at a predetermined angle and identification information given to the divided projection plane are linked and coordinate transformation information of the coordinate information;
   an information control portion configured to specify all of the divided projection planes constituting a projection region of the 3D view image from the virtual viewpoint, to acquire the identification information of the specified divided projection plane, and to acquire the coordinate information of the vertex based on the acquired identification information from the storage portion; and
   a display control portion configured to coordinate-transform the coordinate information of each vertex of the divided projection plane acquired by the information control portion based on the coordinate transformation information of the storage portion, and to create the 3D view image based on the image signal output from the photographing device and the coordinate information after the coordinate transformation; and
   wherein the projection plane includes a hemisphere projection plane, the hemisphere projection plane includes the plurality of divided projection planes divided at predetermined angle intervals in a horizontal direction from a center of a hemisphere, and an identification number is given to the divided projection plane as the identification information in ascending order.

2. The image processor according to claim 1, wherein the information control portion is configured to:
   acquire virtual viewpoint information including a position coordinate, a visual line direction, and a viewing angle of the virtual viewpoint input from a predetermined input portion;
   calculate an angle of the visual line direction to a predetermined reference direction in a horizontal direction based on the position coordinate and the visual line direction of the virtual viewpoint;
   calculate a minimum angle and a maximum angle of the projection region to the reference direction based on the calculated angle and the viewing angle; and
   calculate the identification information of all of the divided projection planes included in the projection region based on the minimum angle and the maximum angle.

3. The image processor according to claim 2, wherein the information control portion is configured to calculate the minimum angle and the maximum angle of the projection region with a following formula where $\varphi$ is an angle of the visual line direction to the reference direction, $\theta$ is the viewing angle, and M is an adjustment value:

$$\mathrm{int}(\varphi)\pm[\mathrm{int}(\theta/2)+M].$$

4. The image processor according to claim 2, wherein the information control portion is configured to:
   calculate coordinate information of intersections A, B of the projection plane and a visual field in the horizontal direction based on the position coordinate and the viewing angle of the virtual viewpoint;
   calculate a viewing angle $\theta'$ from an origin of the projection plane when the origin is assumed as the virtual viewpoint with following equations where AB is a distance between the intersections A, B calculated based on coordinates of the intersections A, B and r is a radius of the projection plane:

$$r^2+r^2-2r^2\cos\theta'=|AB|^2$$

$$\theta'=\arccos(1-|AB|^2/2r^2);\text{ and}$$

calculate the minimum angle and the maximum angle of the projection region from the origin with a following formula where $\varphi$ is an angle to the reference direction of the visual line direction from the origin, $\theta$ is the viewing angle from the origin, and M is an adjustment value $$\mathrm{int}(\varphi)\pm[\mathrm{int}(\theta/2)+M].$$

5. The image processor according to claim 1, wherein the information control portion is configured to change the divided projection plane of the projection region from the virtual viewpoint in the horizontal direction with respect to a single change instruction one by one based on a change instruction of the visual line direction from the virtual viewpoint input from a predetermined input portion or to change the divided projection plane of the projection region with respect to the single change instruction by a plurality of divided projection planes according to an input condition of the change instruction from the input portion.

6. The image processor according to claim 1, wherein the information control portion is configured to change the projection region from the virtual viewpoint according to a traveling condition of the vehicle.

7. The image processor according to claim 1, wherein
   the information control portion is configured to acquire an initial address indicating an area in which the coordinate information of the vertex of the divided projection plane is stored and the number of the vertices from the storage portion for each of the divided projection planes corresponding to the projection region to be output to the display control portion, and
   the display control portion is configured to acquire the coordinate information of all of the vertices of the divided projection plane from the storage portion based on the initial address and the number of the vertices for each of the divided projection planes acquired from the display control portion, and to execute coordinate transformation.

8. An image processing method executable by the image processor according to claim 1, the method comprising:
   a step of specifying all of the divided projection planes constituting the projection region of the 3D view image from the virtual viewpoint;

a step of acquiring the identification information of the specified divided projection plane;

a step of acquiring the coordinate information of the vertex based on the acquired identification information from the storage portion;

a step of coordinate-transforming the coordinate information of each vertex of the acquired divided projection plane based on the coordinate transformation information; and a step of creating the 3D view image based on the image signal output from the photographing device and the coordinate information after the coordinate transformation.

9. An image processor configured to create a three dimensional (3D) view image projected on a predetermined projection plane from a predetermined virtual viewpoint based on an image signal output from a photographing device that captures a surrounding of a vehicle, the image processor comprising:

a storage portion configured to store projection plane vertex information in which coordinate information of each vertex of a divided projection plane acquired by dividing the projection plane into a plurality of divided projection planes at a predetermined angle and identification information given to the divided projection plane are linked and coordinate transformation information of the coordinate information;

an information control portion configured to specify all of the divided projection planes constituting a projection region of the 3D view image from the virtual viewpoint, to acquire the identification information of the specified divided projection plane, and to acquire the coordinate information of the vertex based on the acquired identification information from the storage portion; and a display control portion configured to coordinate-transform the coordinate information of each vertex of the divided projection plane acquired by the information control portion based on the coordinate transformation information of the storage portion, and to create the 3D view image based on the image signal output from the photographing device and the coordinate information after the coordinate transformation; and wherein the information control portion is configured to:

acquire virtual viewpoint information including a position coordinate, a visual line direction, and a viewing angle of the virtual viewpoint input from a predetermined input portion;

calculate an angle of the visual line direction to a predetermined reference direction in a horizontal direction based on the position coordinate and the visual line direction of the virtual viewpoint;

calculate a minimum angle and a maximum angle of the projection region to the reference direction based on the calculated angle and the viewing angle; and calculate the identification information of all of the divided projection planes included in the projection region based on the minimum angle and the maximum angle.

10. The image processor according to claim 9, wherein the information control portion is configured to calculate the minimum angle and the maximum angle of the projection region with a following formula where $\varphi$ is an angle of the visual line direction to the reference direction, $\theta$ is the viewing angle, and M is an adjustment value:

$$\text{int}(\varphi) \pm [\text{int}(\theta/2) + M].$$

11. The image processor according to claim 9, wherein the information control portion is configured to:

calculate coordinate information of intersections A, B of the projection plane and a visual field in the horizontal direction based on the position coordinate and the viewing angle of the virtual viewpoint;

calculate a viewing angle $\theta'$ from an origin of the projection plane when the origin is assumed as the virtual viewpoint with following equations where AB is a distance between the intersections A, B calculated based on coordinates of the intersections A, B and r is a radius of the projection plane:

$$r^2 + r^2 - 2r^2 \cos\theta' = |AB|^2$$

$$\theta' = \arccos(1 - |AB|^2/2r^2); \text{ and}$$

calculate the minimum angle and the maximum angle of the projection region from the origin with a following formula where $\varphi$ is an angle to the reference direction of the visual line direction from the origin, $\theta$ is the viewing angle from the origin, and M is an adjustment value $$\text{int}(\varphi) \pm [\text{int}(\theta/2) + M].$$

* * * * *